United States Patent [19]
Das

[11] 4,417,097

[45] Nov. 22, 1983

[54] HIGH TEMPERATURE, CORROSION RESISTANT COATING AND LEAD FOR ELECTRICAL CURRENT

[75] Inventor: Subodh K. Das, Apollo, Pa.

[73] Assignee: Aluminum Company of America, Pittsburgh, Pa.

[21] Appl. No.: 270,509

[22] Filed: Jun. 4, 1981

[51] Int. Cl.[3] .......................... H01B 7/02; C25C 7/00; B32B 9/04; H01R 3/00

[52] U.S. Cl. ................................ 174/110 A; 204/279; 204/243 R; 204/67; 339/278 C; 373/36; 373/125; 428/471; 428/472; 428/629; 428/633; 428/656; 428/685

[58] Field of Search .................... 204/279, 243 R–247, 204/67; 428/471–472, 629, 632, 633, 652, 653, 428/675, 679, 677, 685, 656; 373/36, 121, 125; 174/110 A, 70 A; 339/278 C

[56] References Cited

U.S. PATENT DOCUMENTS

| | | | |
|---|---|---|---|
| 3,415,631 | 12/1968 | Ault et al. | 428/679 X |
| 3,418,423 | 12/1968 | Bronnes et al. | 428/677 X |
| 3,813,468 | 5/1974 | Shaw | 373/36 |
| 3,837,894 | 9/1974 | Tucker, Jr. | 117/70 A |
| 3,929,426 | 12/1975 | Blust et al. | 428/677 X |
| 4,109,032 | 8/1978 | Marsher | 428/472 X |
| 4,144,380 | 3/1979 | Beltran et al. | 428/679 |
| 4,247,381 | 1/1981 | Schirnig et al. | 204/243 R X |
| 4,255,012 | 3/1981 | Parent et al. | 339/278 C X |
| 4,280,891 | 7/1981 | Neelameggham | 204/243 R |
| 4,312,915 | 1/1982 | Fan | 428/472 X |

*Primary Examiner*—Donald R. Valentine
*Attorney, Agent, or Firm*—Elroy Strickland

[57] ABSTRACT

A low porosity coating comprised of at least two layers of material or composites capable of protecting a metal substrate from the corrosive effects of a chlorine-metal chloride environment at temperature values ranging up to 650° C. The first of the two layers has a coefficient of thermal expansion that lies between the metal of the substrate and that of a metal oxide(s) layer disposed upon the first layer. A layer of metal oxide is disposed on the first layer, the metal oxide having a coefficient of expansion somewhat less than the first layer and a minimum solubility in the chlorine-chloride environment. The material or composite of the first layer and the metal oxide of the oxide layer are applied by a technique which sprays particles of the material or composite and metal oxide(s) against a surface at relatively high velocities and temperatures.

2 Claims, 2 Drawing Figures

HIGH TEMPERATURE, CORROSION RESISTANT COATING AND LEAD FOR ELECTRICAL CURRENT

BACKGROUND OF THE INVENTION

Figure 1:
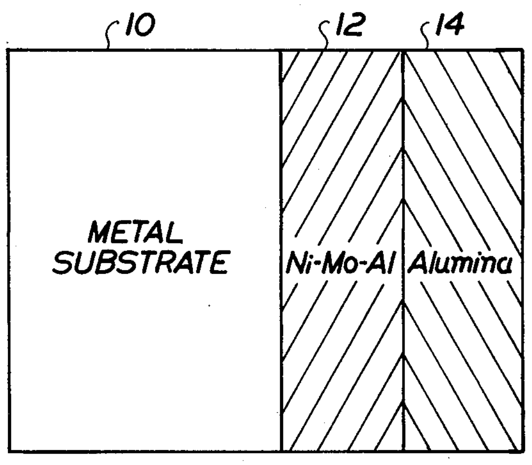

The invention relates to coating structures that are resistive to corrosive attack in an environment of chlorine and metal chloride(s), such as NaCl, LiCl, KCl, $AlCl_3$, $MgCl_2$, $TiCl_4$, $FeCl_3$ and $SiCl_4$.

As discussed in U.S. Pat. Nos. 3,745,106; 3,745,107; 3,809,974 and 3,838,384, all to Stanley C. Jacobs, the commercial realization of the advantages of utilizing aluminum chloride as a source material in the electrolytic production of aluminum has been hampered by the presence of certain unresolved problems, not the least of which has been the provision of low electrical resistance electrode assemblies for applying and removing current to and from the cells employed in the reduction process, and in the process of making aluminum chloride from chlorine gas, alumina-bearing material and carbon in a furnace chamber electrically heated by graphite-resistant heaters. This latter process is discussed, for example, in U.S. Pat. No. 4,171,346 to King et al. The present invention, however, is not limited to the making of aluminum and aluminum chloride. Rather, the invention encompasses the protection of a metal substrate in any metal chloride or chlorine environment at temperatures particularly in a range of 100° to 650° C., such an environment being highly corrosive of all known metals exposed to such an environment.

The efficiency and economy of operation that necessarily attend commercial furnace and cell performance dictate the utilization of low electrical resistance, high current-carrying conductor members wherever possible. Any rapid deterioration of the conductor material, as caused by the above corrosive environment, can only result in markedly reduced performance, and also in frequent shutdown and undue repair and maintenance time and expense, all of which are antithetical to the operational requisites for continuous commercial quantity in the production of metal and the metal chloride.

BRIEF SUMMARY OF THE INVENTION

It has been discovered that a metal lead, such as a copper bar, can be protected in a metal chloride and chlorine environment above 100° C. by coating the lead with an initial layer of a nickel-based composite and then coating the nickel-based composite with a layer of a metal oxide, such as alumina, titanium or magnesium oxide or mixtures thereof. The protection afforded by such layers is enhanced if a layer of steel is first placed between the lead and the nickel-based composite. The thickness of each of the above coatings can be 0.5 to 50 mils and can be applied by thermal spraying techniques such as a plasma flame spraying means, provided, for example, by Metco Company of Westbury, N.Y. Such means provide coatings of low porosity.

In the two layer embodiment the coatings have matching coefficients of thermal expansion, i.e. the order of their position on the copper substrate is the same as the order of the progression of the coefficients of thermal expansion. In addition, the outside alumina layer has minimum solubility in the chlorine-chloride environment, though other metal oxides and mixtures thereof, as discussed hereinafter, have the same or similar characteristics of solubility.

Electrolysis cells for making aluminum from aluminum chloride generate chlorine gas in the process, the cell containing molten salts of $NaCl$-$LiCl$-$AlCl_3$. Other metals (magnesium, zinc, lead and lithium) can be made from their chlorides in solutions of molten salts similar to those of the aluminum making process. In the temperature range of 100° to 650° C., these salts and the chlorine gas critically attack copper leads extending into the cell (for the purpose of supplying current for the electrolysis process). The above coatings have been found to substantially reduce such attack if not prevent the attack altogether.

THE DRAWING

Figure 2:
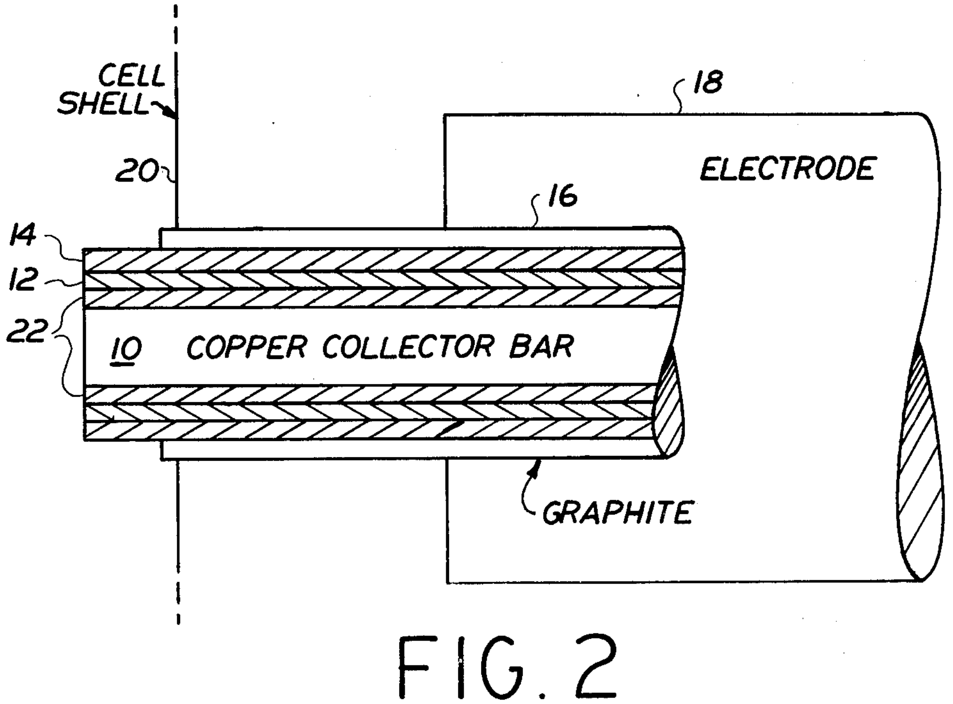

The invention, along with its advantages and objectives, will best be understood from consideration of the following detailed description and the accompanying drawing in which:

FIG. 1 is a diagrammatic sectional view of a protective coating combination of the invention; and FIG. 2 shows an embodiment of the invention in the form of a collector bar for an electrolytic cell, one end of the bar being located in a terminal electrode, both of which are only partially shown.

PREFERRED EMBODIMENT OF THE INVENTION

Referring now to the drawing, FIG. 1 shows diagrammatically and in elevation a first substrate layer 10 of say copper, and two protective layers 12 and 14 in cross section, layer 12 being a composite of say molybdenum, nickel and aluminum. Layer 14 is a layer of a metal oxide that has low solubility in the electrolyte of a cell for producing aluminum from aluminum chloride, for example, or in the chlorinating environment of a reactor furnace employed in making aluminum chloride, as in the above patent to King et al., though again, the invention is not limited thereto; the invention has use in any chlorine-metal chloride environment having a temperature in excess of 100° C. but below 650°. Low solubility materials suitable for layer 14 are alumina ($Al_2O_3$) or a mixture of alumina and titanium oxide ($TiO_2$), though there are other metal oxides and mixtures thereof that have low solubility in the subject environment, as noted earlier.

The nickel base alloy or composite and the alumina coating are both applied to 10 by flame spraying techniques and apparatus using controlled detonations of explosive gas mixtures containing coating powders of the above nickel base alloy and alumina or by electric arc spraying in which the coating materials are melted in the arc and atomized by a high velocity stream of air directed at the substrate to be coated. The stream of air propels the atomized materials onto and against the surface to be coated. Preferably, the two coatings are applied to substrate 10 in an unmixed fashion, i.e. the nickel alloy is applied first and the alumina is then applied to the surface of the nickel alloy coating.

Flame coating techniques are well known in the art and apparatus commercially available. For example, a 15-mil thickness of each of the two coatings applied by the above Metco technique and apparatus provides a low porosity protective cover on a substrate. Such a low porosity cover protects the substrate from the corrosive environment found in electrolytic cells and furnace reactors containing chlorine and metal chlorides. The molybdenum-nickel-aluminum composite, which is available from Metco, is Metco's coating No. 447. The alumina of layer 14 can be formed from a superfine white alumina powder, Metco's No. 105SF, applied by their flame spraying process.

In FIG. 2, the invention is depicted as a collector bar for an electrolytic cell, or as a bar-lead connecting a graphite heater, located in the chamber for reacting porous alumina particles containing carbon with gaseous chlorine, to a source of electrical energy. In FIG. 2, the bar is shown located in a graphite sleeve 16, one end of the sleeve and bar being embedded in an electrode structure 18. The other end of the sleeve and bar extends through the wall or shell 20 of a cell or reaction chamber, for example as shown in the above-mentioned U.S. patents. The length and surface area of the bar 10 between wall 20 and electrode 18 are coated with the above materials and in the manner described above before graphite sleeve 16 is disposed on the bar. Sleeve 16 is itself a protective structure for the bar, but the above coatings have been found effective to protect the bar without sleeve 16 in a chlorine-metal chloride environment and at a temperature above 100° C.

To insure further the protection of metal bar 10, a coating of ferrous material 22 (FIG. 2), such as stainless steel, can be provided on the surface of bar 10 before coatings 12 and 14 are applied. A layer thickness of 15 mils of coarse 316 stainless powder was applied to a copper bar (10) by a Metco flame spray process (Metco coating No. 41C) and found to provide good protection of the bar, in combination with coatings 12 and 14.

The order of the layers of protective materials on copper substrate 10 (in FIG. 1) is the same order as the progression of their coefficients of thermal expansion ($\alpha$), i.e. the innermost copper material has the greatest rate of expansion ($25.8\times10^{-6}$/°C.), while the next layer, which is composite 12, has a rate somewhat less, the rate being $15.6\times10^{-6}$/°C. The result of such a progression of coefficients is that the expansion and contraction of the most expansive element, which is the copper material 10, does not crack the least expansive element, which is the outermost oxide layer 14.

The coefficient of expansion of the alumina of layer 14 is $9.9\times10^{-6}$/°C. Again, though this coefficient is substantially less than that of the copper of bar 10, it is close enough to the nickel composite of layer 12 to avoid breaking layer 14 during periods of temperature changes in the associated cell or reaction chamber.

This coating system of the invention has been tested at 500° C. for 24 hours, immersed in 70 wt.% aluminum chloride and 30 wt.% sodium chloride eutectic with chlorine bubbled therethrough. The sample showed virtually no weight or dimensional changes. A microscopical examination revealed no surface deterioration, i.e. no peeling off or crazing of the surface.

The above embodiments provide highly protective coatings for metal substrates in chlorine-metal chloride environments. The coatings are efficient and economical to make since the materials and techniques of application are commercially available. The coatings, in addition, are operative in a relatively high temperature range, the upper limit of which is about 650° C., while the outermost oxide layer has minimal solubility in the chlorine-metal chloride environment.

While the invention has been described in terms of preferred embodiments, the claims appended hereto are intended to encompass all embodiments which fall within the spirit of the invention.

What is claimed is:

1. A steel substrate having a coating thereon to protect the same from the highly corrosive effects of a metal chloride and chlorine environment, the coating comprising:

a first layer of metal disposed on the substrate and having a coefficient of thermal expansion that is between that of the metal of the substrate and that of a metal oxide layer located on the first layer, and a layer of metal oxide disposed on the first layer, the metal oxide having (1) a coefficient of thermal expansion somewhat less than that of the first layer, and (2) minimum solubility in the chloride chlorine environment, the metal oxide layer being a mixture or combination of any two or all three of the group of oxides consisting of titanium, magnesium and aluminum oxide, the two layers being resistant to corrosive attack by the environment and thereby capable of protecting the steel substrate from the environment.

2. A lead for conducting electrical current to or from an electrolytic cell for making aluminum from aluminum chloride, the lead comprising:

an electrically conductive, low electrical resistance lead member adapted to extend into a chamber, the material of the lead member being highly susceptible to corrosive attack by the environment, a layer of steel located on the lead member, a first layer of metal disposed on the steel layer, and having a coefficient of thermal expansion that lies between that of the material of the lead member and that of a metal oxide layer disposed on the first layer, and a layer of metal oxide disposed on the first layer of metal, the metal oxide having (1) a coefficient of thermal expansion somewhat less than the metal layer, and (2) minimum solubility in the chlorine chloride environment, the metal oxide layer being a mixture or combination of any two or all three of the group of oxides consisting of titanium, magnesium and aluminum oxide, the layers of metal and metal oxide being resistant to corrosive attack by the environment and thereby capable of protecting the lead member from the environment.

* * * * *